(12) United States Patent
Harrison

(10) Patent No.: US 6,745,452 B1
(45) Date of Patent: Jun. 8, 2004

(54) APPARATUS FOR ASSEMBLING TEMPORARY ROAD MATS

(76) Inventor: Ronald Harrison, 3420 Mackeys Rd., Plymouth, NC (US) 27692

( * ) Notice: Subject to any disclaimer, the term of this patent is extended or adjusted under 35 U.S.C. 154(b) by 0 days.

(21) Appl. No.: 10/407,992

(22) Filed: Apr. 7, 2003

(51) Int. Cl.[7] .............................. B23P 11/00; B27B 5/00
(52) U.S. Cl. ...................... 29/525.02; 144/35.1; 408/25; 408/51; 408/53; 269/296; 269/303
(58) Field of Search ........................ 29/525.02, 525.11, 29/464, 281.1, 281.5, 467, 26 A, 563, 564; 144/35.1; 269/910, 296, 297, 298, 299, 303; 408/51, 43, 49, 53, 48, 46, 25

(56) References Cited

U.S. PATENT DOCUMENTS

| 410,784 A | * | 9/1889 | Colville | 408/51 |
|---|---|---|---|---|
| 3,255,943 A | * | 6/1966 | Sanford | 269/910 |
| 4,410,024 A | * | 10/1983 | Folse, Sr. | 144/35.1 |
| 4,736,511 A | * | 4/1988 | Jenkner | 144/35.1 |
| 4,824,004 A | * | 4/1989 | Hanson | 269/910 |
| 4,922,598 A | * | 5/1990 | Pouyer | 29/281.5 |
| 5,095,605 A | * | 3/1992 | Tonus | 29/464 |
| 5,234,204 A | * | 8/1993 | Hunt | 269/910 |
| 5,555,617 A | * | 9/1996 | Pope | 269/910 |
| 6,039,514 A | * | 3/2000 | O'Donovan et al. | 408/53 |
| 6,099,212 A | * | 8/2000 | Marocco | 408/51 |
| 6,354,581 B1 | * | 3/2002 | Johnson et al. | 269/910 |
| 6,523,243 B2 | * | 2/2003 | Phillips et al. | 29/464 |

* cited by examiner

*Primary Examiner*—David P. Bryant
(74) *Attorney, Agent, or Firm*—Mills Law Firm PLLC

(57) ABSTRACT

An apparatus for making temporary road mats characterized by multiple layers of mutually perpendicular elongated timbers having an array of vertical intersections aligned in lateral rows. The apparatus includes a pair of assembly tables spaced along an assembly line on a work floor. Each table has an upper layout surface spaced vertically above the work floor and provides a work bay therebelow. The layout surface having indicia for orienting the discrete timbers in each layer whereby the timber may be roughly assembled. A gang drill moves in a longitudinal path along the assembly line with respect to the assembly tables. The gang drill carries a plurality of drills for sequentially drilling the lateral rows of intersections. The gang drill alternates between tables while manual assembly operations are conducted at the other table.

16 Claims, 6 Drawing Sheets

APPARATUS FOR ASSEMBLING TEMPORARY ROAD MATS

FIELD OF THE INVENTION

The present invention relates to temporary road surfaces and, in particular, to a machine for assembling temporary road mats.

BACKGROUND OF THE INVENTION

Temporary road mats are used extensively to allow vehicles and equipment to reach locations not serviced by permanent roads, particularly under conditions where ground surface would not support the traffic or where the temporary nature of use does not warrant the time and expense of a permanent road. The mats are generally constructed in multiple layers of heavy wood timbers in crisscrossing layers. The mats may also be provided with interlocking joints for connecting with adjacent mats as disclosed in U.S. Pat. No. 4,462,712 to Penland; U.S. Pat. No. 5,032,037 to Phillips et al.; and U.S. Pat. No. 4,889,444 to Pouyer. Commonly, each layer is nailed to the underlying layer. The final layer is fastened with extended length nails having protruding tips that crimped over to secure the assembly as disclosed in U.S. Pat. No. 5,234,204 to Hunt. The manual assembly, even with air powered nailing guns is time consuming and tiring and prone to misalignments.

Various assembly devices have been proposed for more accurately aligning the timber layers prior to nailing. U.S. Pat. No. 4,922,598 to Pouyer discloses an assembly table having an array of alignment stops for assisting positioning the timbers prior to nailing. U.S. Pat. No. 5,234,204 to Hunt, referenced above, discloses a dual stage assembly table facilitating nailing on opposite sides of the mat. Crimped extended length nails are used on the final layer to resist a lifting of the nail heads that can damage vehicle tires.

The nailing of the timbers also precludes convenient repair and replacement of damaged timbers. Typically, the mat must be substantially disassembled to access and replace damaged members. Such limitations have been overcome by the use of bolted mat configurations. Therein, holes are drilled at the intersections of the crossed timbers for receiving threaded fasteners. The resulting construction provides a smooth upper surface free of protruding nail heads. When replacement of a member is required, only the fasteners in the affected area need to be removed to allow substitution. Notwithstanding the advantages of the bolted construction, production rates, even with fixtures and assembly tables, have been limited by the cycle times of the serially required operations.

BRIEF SUMMARY OF THE INVENTION

The present invention provides an improved method for making bolted temporary road mats wherein an assembly line includes a pair of in-line, phase opposed multilevel assembly tables supplied with precut timbers from conveyor systems including a trimming station. The precut timbers are oriented into multiple layers of mutually perpendicular timbers atop the table. A mobile gang drill carrying a plurality of drill heads travels along rails at the sides of the assembly tables and sequentially drills through holes at each lateral row of timber intersections. Carriage bolts are inserted downwardly through the drilled holes as completed. At lower bays beneath the assembly tables, nuts are assembled on the bolts to provide a unitized assembly.

During the drilling at the first table, another mat is assembled at the other table. Following completion at the first table the gang drill indexes to the second table and performs the drilling sequence thereat, while the bolts are fastened at the first table. The gang drill alternates between the tables, with upper and lower crews transferring between tables for continuity and efficiency.

In one aspect of the invention there is provided an improved apparatus for making temporary road mats of bolted construction characterized by multiple layers of mutually perpendicular elongated timbers having an array of vertical intersections comprised of longitudinally spaced lateral rows, wherein said apparatus comprises: a pair of assembly tables spaced along an assembly line of a work floor, each of the tables having an upper layout surface spaced vertically above the work floor and providing a work bay therebelow, said layout surface having indicia for orienting the discrete timbers in each layer whereby said timber may be roughly assembled thereon into said layers with said intersections; a gang drill assembly supported for controlled movement in a longitudinal path along said assembly line with respect to said pair of assembly tables, said gang drill assembly carrying a plurality of drill units above said layout surface aligned for drilling the lateral rows of intersection; means for aligning said drill units at said lateral rows and for downwardly moving said drill units to form through holes through said timbers at said intersections subsequent to which bolts are inserted into said through holes from above said layout surface and fasteners are connected with said bolts in said work bay, the movement of said gang drill assembly and the sequence of said drilling being alternated between said assembly tables.

Accordingly, it is an object to provide an improved temporary road mat having threaded fasteners releasably interconnecting the various components.

A further object is to provide an improved apparatus for assembling temporary road mats wherein rough timbers are feed on a conveyor system through a trimming station to provide precut timbers to a pair of spaced assembly tables for positioning into multiple crossed layer orientation and a longitudinally positionable multiple drill assembly alternately drills fastener holes in the timbers at each table.

Another object is to provide an apparatus for assembling bolted temporary road mats wherein a gang drill assembly is used to simultaneously drill lateral rows of through holes for receiving fasteners for interconnecting the mat components.

DESCRIPTION OF THE DRAWINGS

The above and other features and advantages of the invention will become apparent upon reading the following written description taken in conjunction with the accompanying drawings in which.

DETAILED DESCRIPTION OF THE PREFERRED EMBODIMENT

Figure 1:
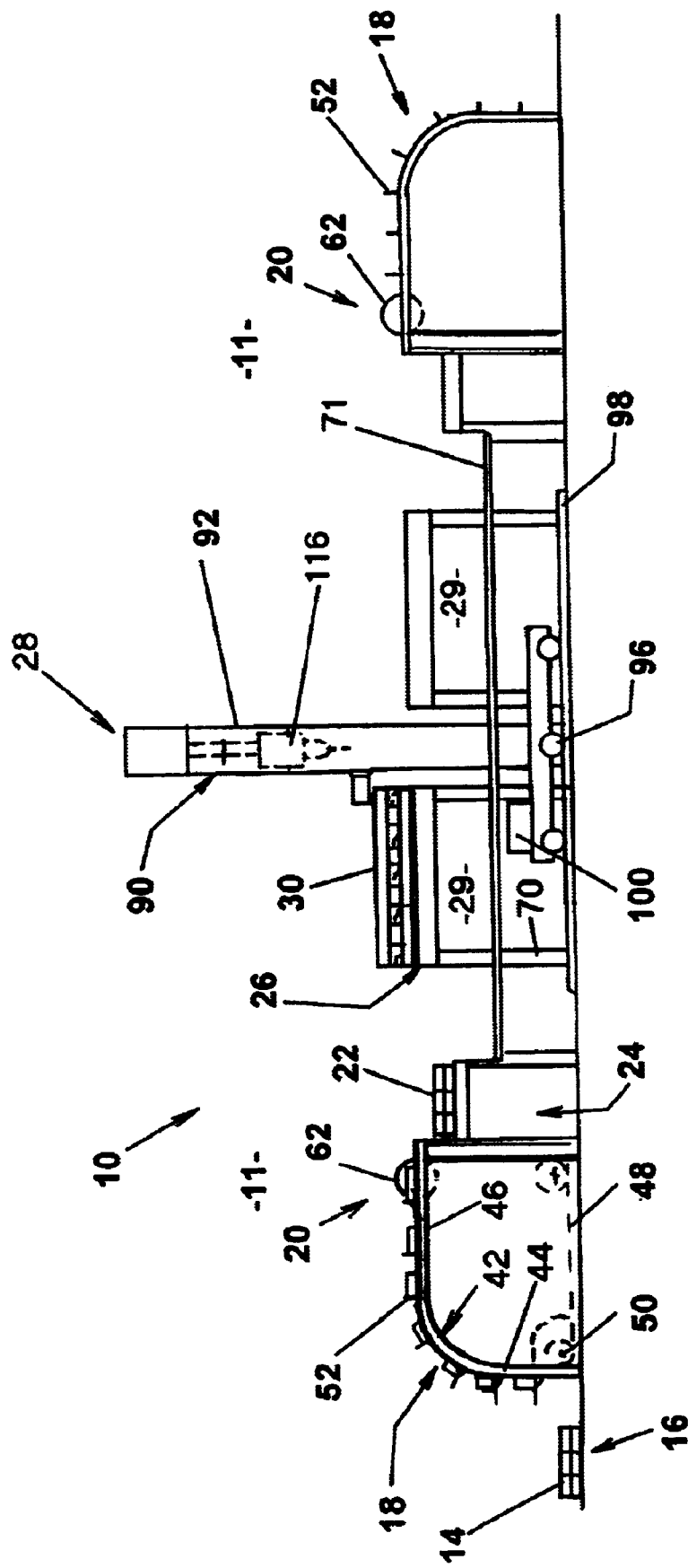
FIG. 1 is a side elevational view of an apparatus for the manufacture of temporary road mats in accordance with a preferred embodiment of the invention.

Referring to the drawings for the purpose of illustrating a preferred embodiment of the invention and not for limiting same, FIG. 1 shows an assembly apparatus 10 for the manufacture of temporary road mats. The apparatus 10 comprises a pair of in-line multilevel assembly lines 11. At the outer end of each line 11 rough wooden timbers 14 are delivered to a loading area 16, transferred by conveyor 18 through trimming station 20 to produce finished timbers 22 and unloaded at transfer area 24. The finished timbers 22 are assembled on assembly tables 26, drilled at vertical locations by a mobile gang drill 28, and fastened at underlying fastener bays 29. Fully assembled mats are removed from the assembly tables 26 by suitable material equipment such as overhead cranes or mobile fork lifts.

Figure 7:
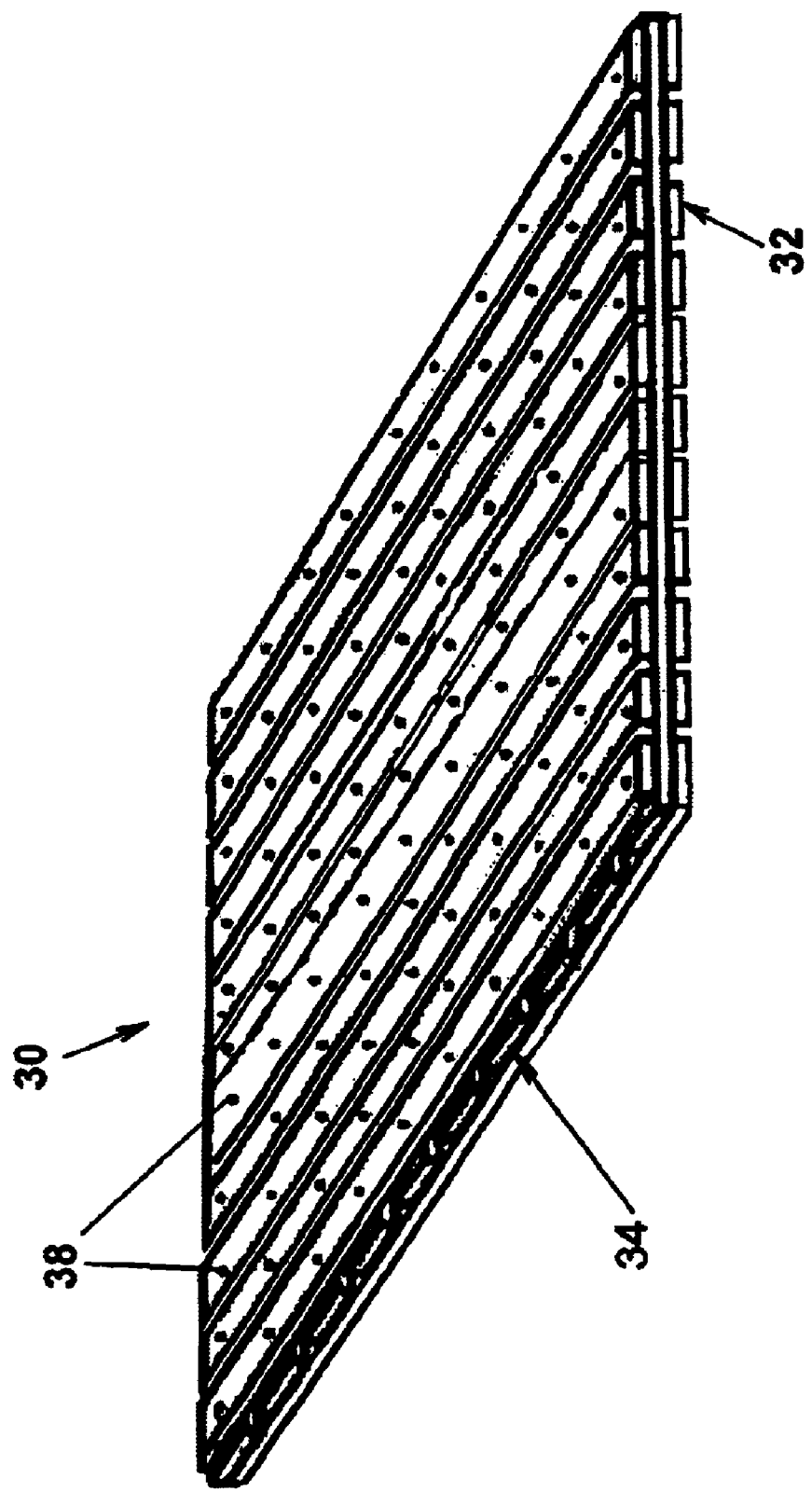
FIG. 7 is a perspective view of the temporary road mat in accordance with one embodiment of manufacture;.

Referring to FIG. 7, a completed temporary road mat 30, according to one embodiment, comprises three mutually perpendicular layers of spaced finished timbers. The width and length of the mat are generally in two foot increments and the mat is rectangular in shape, for instance 8 feet by 12 or 16 feet. Depending on load requirements, two layers may be sufficient and in severe environments, greater than three layers may be preferable. Moreover, the ends and sides may have staggered ends adapted for interlocking assembly. Further, the top lay may be configured for distinct vehicle tracks. For each of the above and the like, the layers must be securely interlocked to maintain structural integrity during use.

The mat 30 comprises a first or base layer 32 having longitudinally extending, laterally spaced members, a second or middle layer 34 having laterally extending, longitudinally spaced members, and a third or top layer 36 having longitudinally extending, uniformly laterally spaced members vertically overlying the first layer. The assembly thus forms distinct, mutually perpendicular layers of intersecting rows and columns in grid array of mutually overlying intersections. Through holes, as hereinafter described, are drilled through the overlapping members at such intersections. Suitable fastener systems 38 extend through the holes and bolted for mutually clamping the layers together. In the present invention a carriage bolt is inserted downwardly through each hole and a nut threaded thereto at the lower surface.

Figure 2:
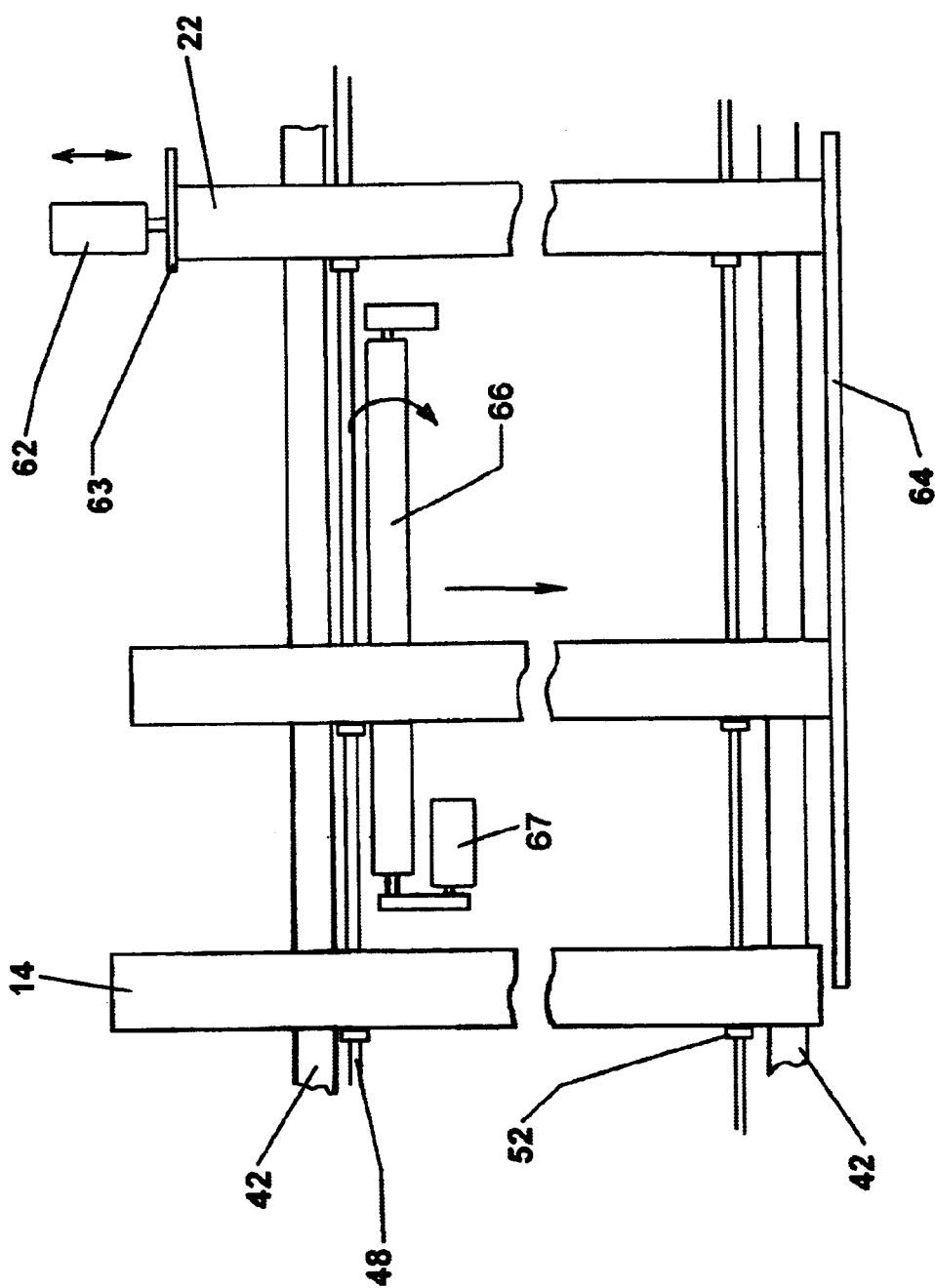
FIG. 2 is a top view of the conveyor and trimming station for the apparatus showing the trimming of rough timbers to length.

As shown in FIGS. 1 and 2, timbers roughly to length are delivered to a loading area in front of the conveyor 16. The conveyor 16 includes a support assembly 40 having a pair of laterally spaced guide rails 42. The guide rails 42 include upwardly curved, arcuate entry legs 44 merging with horizontal top legs 46. A drive chain 48 is guided on sprockets for guided movement adjacent the guide rails. A control motor 50 is operatively connected to the drive chain 48 for operating the chain under manual or automatic control. Each drive chain 48 carries a plurality of spaced transfer dogs 52 that project outwardly of the guide rails 42. The rough timbers 14 are sequentially loaded on the dogs 52 and transferred forwardly by the drive chain upwardly along the entry legs 44 and inwardly along the top legs 46.

The conveyor 16 extends through the trimming station 20 and delivers the cut timbers to the transfer area 26. The trimming station 20, as shown in FIG. 2 includes a laterally adjustable circular saw unit 62, a fence 64 and a transfer roll 66. The transfer roll 66 is operatively connected to a drive unit 67 for rotation as shown by the arrows. The saw unit 62 is mounted for adjustable transverse movement as indicated by the arrows. As the rough timbers 14 are carried into the trimming station 18, the transfer roll 66 laterally shifts the timbers outwardly against the fence 64. The circular saw unit 62 is positioned downstream beyond the transfer roll 66 and laterally positioned to make a cross cut on the timbers representing a selected length between the saw blade and the fence, corresponding to the lengths in the desired mat layer. The range of adjustment between the saw unit and the fence is sufficient to handle sizing of the various timbers for the manufactured mat designs.

After trimming to length, the timbers for a layer are housed at staging area 24 prior to layout on the assembly tables. The assembly tables 26 are carried on support frames 70 elevated above the work floor at a sufficient height to establish a work bay 29 therebelow to enable workers to bolt the mats together as described below. The elevation of the tables 26 is slightly above the transfer area for providing ease of manual alignment of the members on the assembly tables. The tables 26 are surrounded and mutually spaced by elevated walkways 71 for permitting movement of the workers thereabout. Depending on production rates, a single crew on the upper level may alternate between the tables, and bolting crews alternate between the bays. Alternatively, a single crew may sequentially handle upper and lower level operations.

Figure 3:
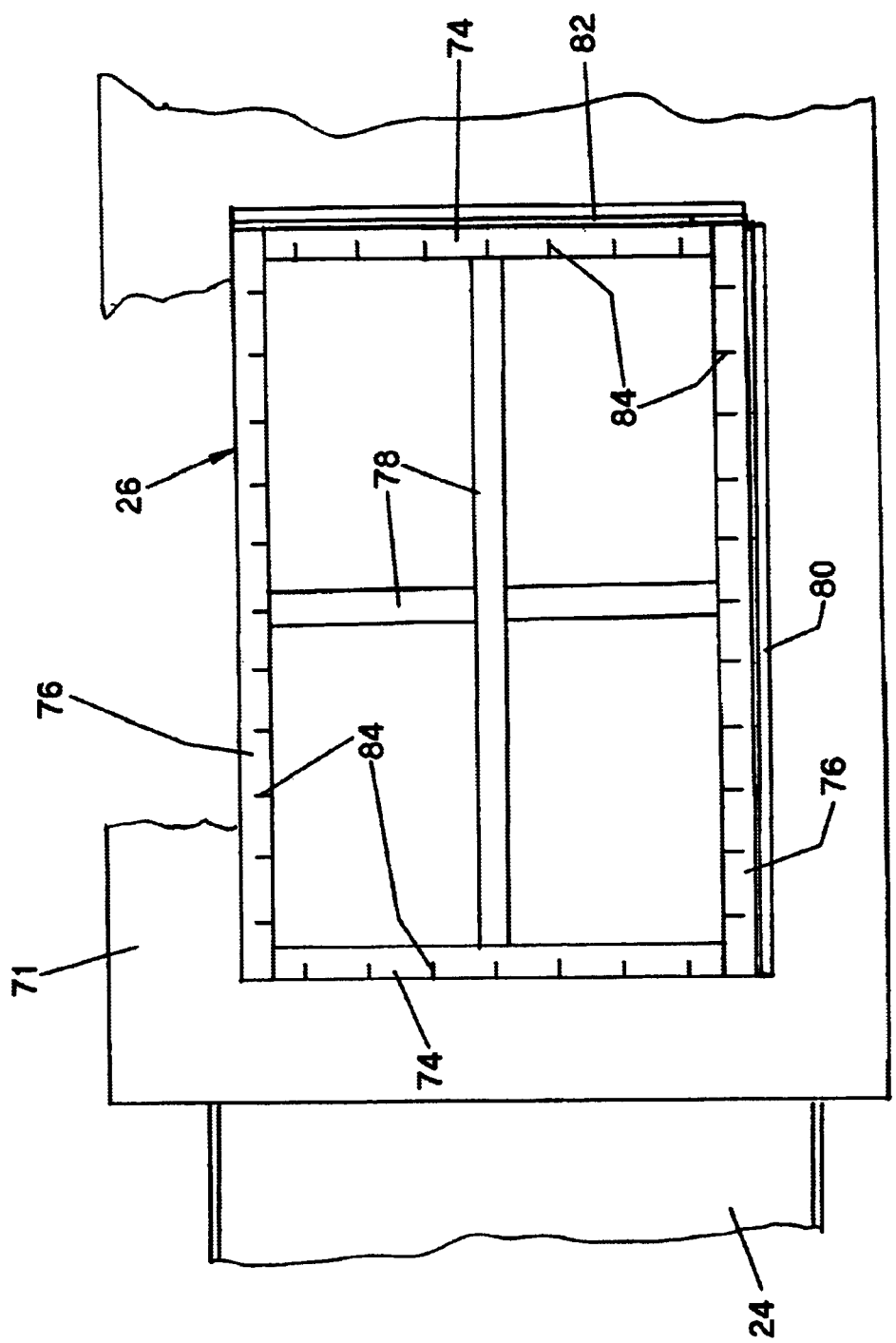
FIG. 3 is a top view of an assembly table and surrounding walkway for the apparatus.
Figure 4:
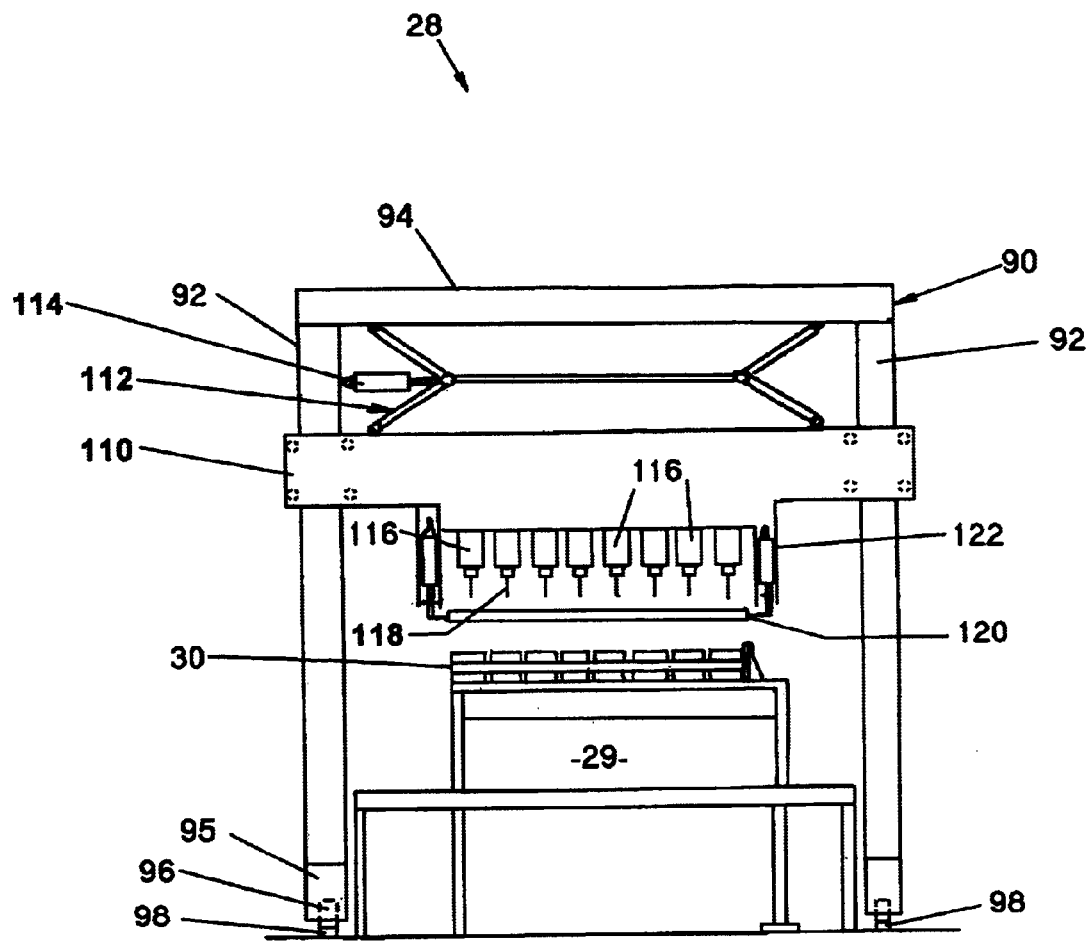
FIG. 4 is a front elevational view of the assembly table and mobile gang drill.

Referring to FIG. 3, the assembly tables 26 are provided a top frame including peripheral end supports 74 and side supports 76 interconnected with interior supporting members 78. A lateral fence 80 is aligned and attached at one side support 76, and a longitudinal fence 82 is aligned and attached at the inner end support 74 thereby providing an alignment surface for accurately positioning the ends of the timbers of the respective layers. Additional pivotal fences and clamps may be provided at opposed ends of the respective fences to mechanically position the timbers against the prime fences 80, 82. Additionally, the lateral and longitudinal sides are provided with spaced indicia 84 and/or affirmative locators for accurately referencing and establishing respective timber placement.

For assembling the bottom layer, the timbers 22 are removed from the transfer area 24, positioned against the end fence 82, and aligned with the indicia 84 to provide a longitudinal array of laterally spaced timbers for the bottom layer. Concurrently therewith, the trimming station 18 may be adjusted to trim the next set of timbers traversing the conveyor 16 to the determined length and in the required number for the middle layer. Alternatively, the middle layer timbers may be sized at a separate location and transferred to the assembly table for positioning atop the bottom layer.

After location of the bottom layer, the ends of the middle layer timbers are positioned against the lateral fence 80 and aligned with the indicia 84 to provide an aligned lateral array perpendicular to the bottom layer. Thereafter the upper set of timbers is trimmed and aligned mutually perpendicular to the middle layer, as described above, ready for drilling with the mobile gang drill 28.

The mobile gang drill 28 comprises a shuttle 90 having side support legs 92 laterally on either side of the line 10 and interconnected by a cross member 94. The legs include a horizontal base 95 carrying rollers 96 that are supported on longitudinal guide rails 98 spaced on the lateral sides of the assembly tables 11. A drive motor 100 is operatively connected with the rollers 96 is operable manually or automatically to move the gang drill 28 to controlled positions along the guide rails. A tool bar 110 is supported by a parallel linkage 112 at the cross member 94 and moved vertically by actuating cylinder 114 between raised and lowered positions. A plurality of drills 116 including drill bits 118 are carried on the tool bar 110 and adjustable laterally to register with the overlapping intersections of mat timbers for the design being manufactured. A press plate 120 is slidably supported at the legs 92 for vertical movement under the manual or automatic control of actuators 122. The press plate 120 is lowered to compressively clamp the timber layers adjacent the drills to prevent any misalignment of the timbers during the drilling.

Figure 5:
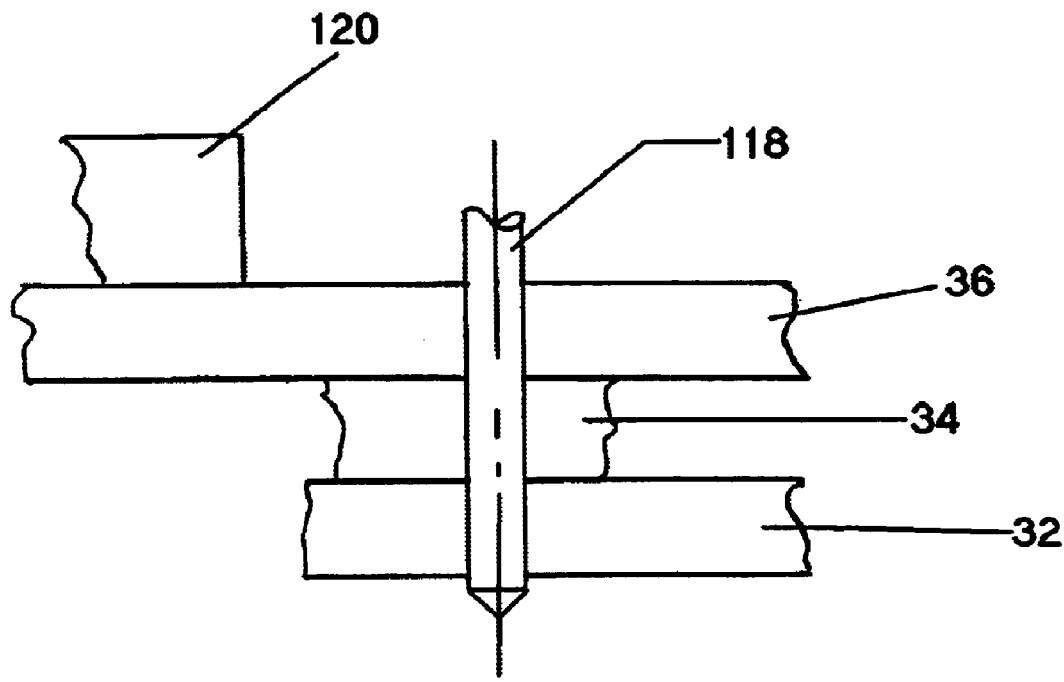
FIG. 5 is a cross sectional view illustrating the drilling of the timbers.
Figure 6:
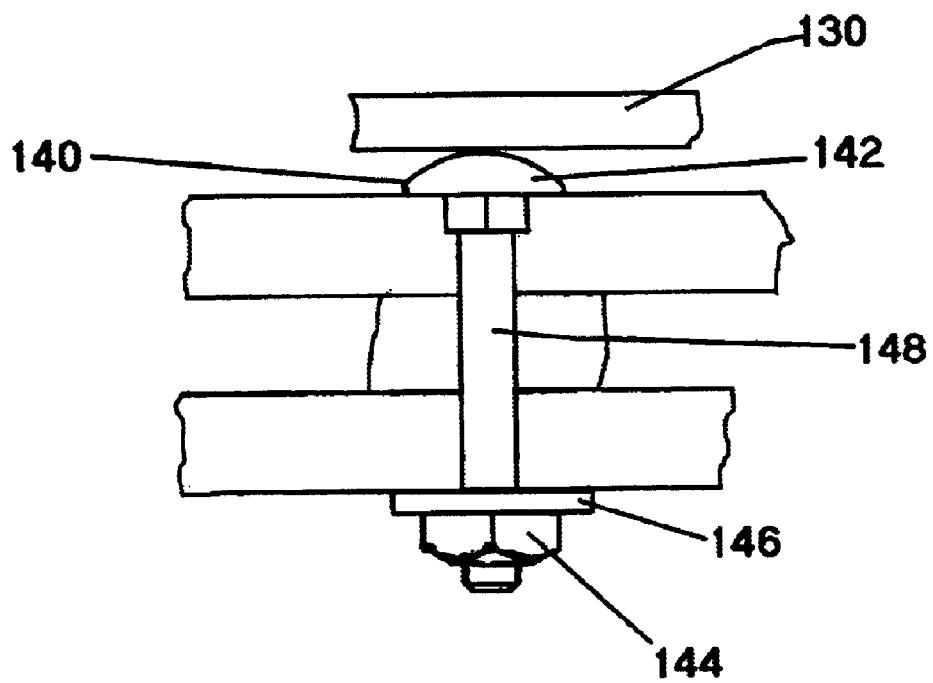
FIG. 6 is a cross sectional view of the timbers and carriage bolt fasteners.

For the drilling sequence, the gang drill is indexed, manually or automatically, to position the drills over the outermost lateral row of timber intersections. Thereafter as shown in FIG. 5, the drills are energized and the actuator 122 extended to lower the press plate 120 to clamp the timbers. The actuator cylinder 114 are extended to lower the tool bar 110 thereby simultaneously drilling a lateral series of vertical holes completely through the three layers timbers. The drills 116 are withdrawn by the actuator cylinder 114, the press plate 120 raised by actuator 122, and the gang drill 28 moved to the next lateral set of intersections for repeating the foregoing drilling sequence. The drilling continues until all holes have been drilled. Thereafter, the drill assembly is parked intermediate the tables prior to undertaking the drilling sequences at the other table.

Referring to FIG. 5, following the drilling on the first row, the carriage bolts 140 are manually inserted into the drilled holes as available and until completed. After insertion of all the carriage bolts, a cover plate 130 is lowered onto the table over the bolt heads 142 to maintain position thereof during fastening. A work crew in the assembly bay 29 then fastens the nuts 144 and washers 146 to the threaded shank 148 of the bolts 140 using powered socket wrenches to unitize the assembly. Following completion, the cover plate is removed and the finished mat transferred from the table by suitable material handling equipment such as a forklift or mobile crane.

The apparatus above described allows work crews to continuously operate on both tables. During the drilling sequence at one table, the mats are rough assembled on the other table. During the fastening at the first table, drilling is done at the other table. During assembly at the first table, the fastening is performed at the other table. In this manner, both tables are continuously used with the workload shifting between the levels. Moreover, the work crews may alternate between the tables at both levels or between levels at one table thereby efficiently utilizing both labor and machine component. It will thus be appreciated that the two bays working in tandem are able to balance machine and manual time content to utilize the equipment and labor in a productive efficient manner. Compared to serial drilling and fastening wherein about 2 mats per hour could be produced, the inline dual table of the present invention outputs completed mats at the rate of about 10 per hour with comparable labor content per mat.

It will be appreciated that the foregoing apparatus may be employed for the manufacture of differing sizes, layout and number of intersecting timber layers. Interlocking and/or staggered mat designs may be accommodated by table and drill layout. Further, dedicated wheel track patterns of current design may also be produced.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. An apparatus for making temporary road mats characterized by multiple layers of mutually perpendicular elongated timbers having an array of vertical intersections comprised of longitudinally spaced lateral rows, said apparatus comprising: a pair of assembly tables spaced in adjacent relation on a work floor, each of the tables having an upper layout surface spaced vertically above the work floor and providing a work bay therebelow, said layout surface having indicia for orienting discrete timbers in each layer whereby said timber may be roughly assembled thereon into said layers with said intersections; a gang drill assembly supported for controlled movement in a longitudinal path along said assembly line with respect to said pair of assembly tables, said gang drill assembly carrying a plurality of drill units above said layout surface aligned for drilling said lateral rows of intersections; means for aligning said drill units discretely at said lateral rows and for downwardly for moving said drill units to form through holes through said timbers at said intersections subsequent to which bolts are inserted into said through holes from above said layout surface and fasteners are connected with said bolts in said work bay, the movement of said gang drill assembly and the sequence of said drilling being alternated between said assembly tables.

2. The apparatus as recited in claim 1 wherein said gang drill assembly includes means for compressing said timbers adjacent to and during said drilling to prevent relative movement of the timbers.

3. The apparatus as recited in claim 2 including conveyor means at opposite ends of said line for transferring timbers inwardly therealong to each assembly table.

4. The apparatus as recited in claim 3 including a trimming station, wherein roughly cut timbers are transferred on said conveyor means past said trimming station whereat said timbers are cut to desired length for use in said layers.

5. The apparatus as recited in claim 4 including elevated walkways surrounding said tables for permitting mobility of a workforce between said tables.

6. The apparatus as recited in claim 1 wherein rail means are disposed along said longitudinal path and said drill assembly includes a pair of support legs interconnected by a cross member and having roller members supported on said rail means.

7. The apparatus as recited in claim 6 including drive means operatively connected with said roller members for moving said drill assembly along said path.

8. The apparatus as recited in claim 7 wherein said drill units are carried on a transverse member slidably supported on said support legs.

9. The apparatus as recited in claim 8 including actuator means for moving said drill units between a raised position and a lowered position for performing said drilling.

10. The apparatus as recited in claim 9 including means carried on said drill assembly and moveable between a raised position and a lowered position for compressing said timbers during said drilling.

11. A method of assembling temporary road surfaces having a least two mutually perpendicular layers of elongated members overlapping at lateral rows of vertical intersections comprising the steps of: providing a pair of assembly tables aligned in back to back relation along a longitudinal path; orienting a first layer of said elongated members on each table; orienting a second layer of said elongated members on each table perpendicular to said first layer to establish a roughly assembled mat with said intersections providing a mobile drill assembly moveable along said path between said tables; providing a plurality of drilling units on said drill assembly and aligned for drilling through holes in unison through intersections in said lateral rows; downwardly moving said drill units for drilling said holes in said lateral rows; removing said drill units from said holes subsequent to said drilling; sequentially longitudinally moving said drill units to subsequent lateral rows and performing said drilling until all required holes in said mat are completed; and moving said drill assembly to the other assembly table and sequentially drilling the holes in the lateral rows of the roughly assembled mat thereon.

12. The method as recited in claim 11 including the step of inserting bolts through said holes subsequent to said drilling.

13. The method as recited in claim 12 including the step of applying nuts to said bolts to form a unitized assembly of said members.

14. The method as recited in claim 13 including the step of mechanically clamping said members adjacent to and during said drilling to prevent relative movement therebetween.

15. The method as recited in claim 14 including alternating the workforce between said tables prior and subsequent said drilling.

16. The method as recited in claim 15 including the step of beginning said drilling on an outer lateral row and progressing inwardly therefrom.

* * * * *